United States Patent [19]

Byrne

[11] Patent Number: 5,295,652
[45] Date of Patent: Mar. 22, 1994

[54] ISOLATION GROMMET

[76] Inventor: Thomas W. Byrne, 439 Harrison St., Unit C, Corona, Calif. 91719

[21] Appl. No.: 901,155

[22] Filed: Jun. 19, 1992

[51] Int. Cl.⁵ ............................................. F16L 5/00
[52] U.S. Cl. .................................. 248/635; 248/609; 16/2
[58] Field of Search ...................... 248/635, 231, 609; 76/2, 108

[56] References Cited

U.S. PATENT DOCUMENTS

| | | | |
|---|---|---|---|
| 3,091,795 | 6/1963 | Budwig | 16/2 |
| 3,197,556 | 7/1965 | Simon | 16/2 |
| 4,783,039 | 11/1988 | Peterson et al. | 248/635 |
| 4,858,880 | 8/1989 | Durand | 248/635 |
| 4,869,454 | 9/1989 | Byrne et al. | 16/2 |

Primary Examiner—Richard K. Seidel
Assistant Examiner—Allan M. Schrock
Attorney, Agent, or Firm—Michael Bak-Boychuk

[57] ABSTRACT

A grommet assembly useful in attaching articles to a carrying structure includes a first and second annular grommet piece, each conformed for mating engagement to the other, the first grommet piece including a central boss extending axially from one side of an annular base provided with a tapered cavity therein. The second grommet piece is similarly provided with an axial boss tapered on the exterior to fit within the cavity. The free edge of the second boss includes a peripheral bead conformed to engage an interior recess in the cavity. The grommet pieces may be joined to each other by a flexible strap and the first piece may include a bedded washer on the surface opposite to the first boss. Both the grommet pieces and the strap may be formed of a resilient material structure and when the bosses are mated in each other the subsequent compression of the assembly will expand the combined sectional dimension thereof for compressing against the surfaces of any suspension device.

1 Claim, 1 Drawing Sheet

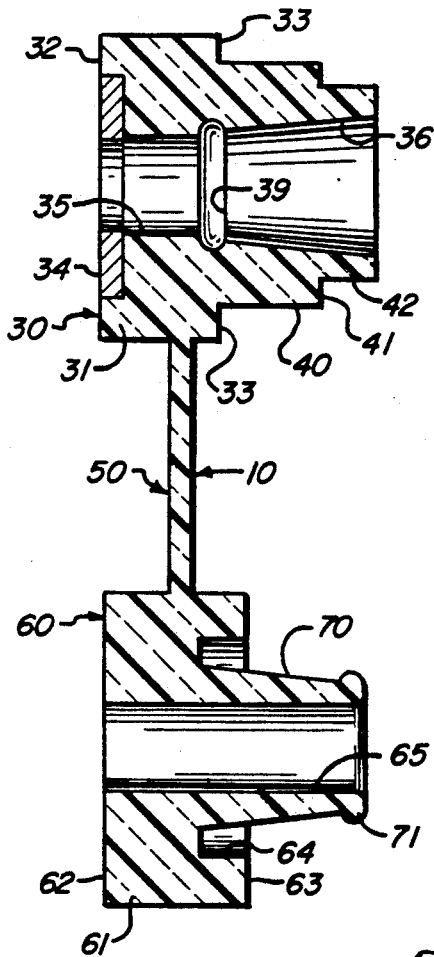
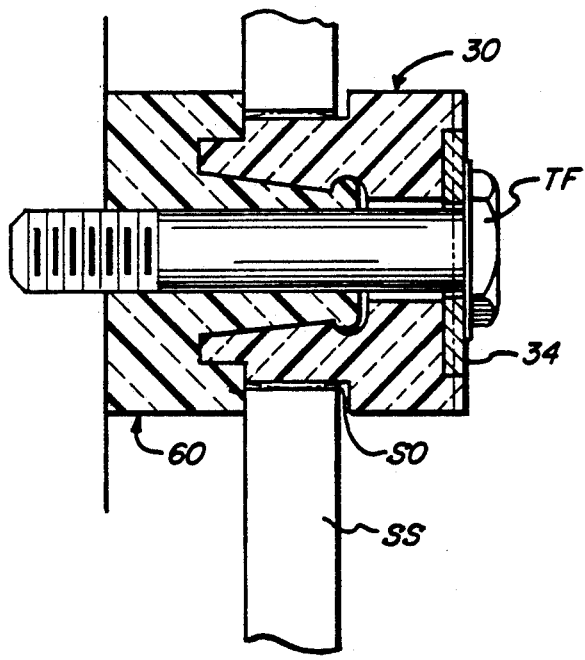# 
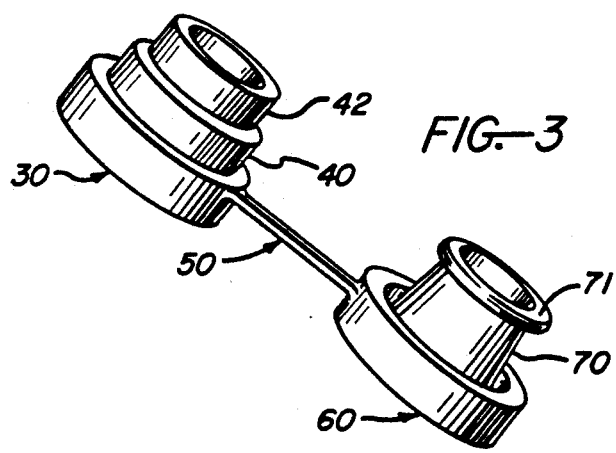

ISOLATION GROMMET

BACKGROUND OF THE INVENTION

1. Field of the Invention

The present invention relates to resilient attachment isolators, and more particularly to resilient bushings for attenuating the mechanical motion of a suspended device.

2. Description of the Prior Art

In my prior U.S. Pat. No. 4,869,454, filed jointly with Thomas J. Muella, we described a resilient grommet assembly which is particularly useful in attenuating lateral vibrations passed through a suspension strap. To achieve this attenuation we have provided a set of mating grommets each including a resilient annular ring aligned on the opposite sides of the suspending strap. The compliance of these rings, effected by the geometry, resolves both the bending and the lateral modes of the strap. In the foregoing manner a large component of acoustic transfer is resolved, rendering the foregoing grommet particularly useful in the suspension of exhaust components in an automobile.

Since that time various other uses became apparent, including uses requiring substantial structural loading. The requirements of low (acoustic) frequency attenuation, with the attendant low compliance, are not present in a highly loaded structure and the higher frequency, higher energy spectra present the bigger the concern. For these reasons a suspension grommet, particularly structured for high energy attenuation, is desired and it is one such grommet structure that is disclosed herein.

SUMMARY OF THE INVENTION

Accordingly, it is the general purpose and object of the present invention to provide a suspension grommet conformed for expansion within the suspended aperture.

Other objects of the invention are to provide a suspension grommet useful in transferring substantial low frequency to the suspending structure.

Yet further objects of the invention are to provide a suspension grommet which is convenient in use, simple in manufacture, and effective in various applications.

Briefly, these and other objects are accomplished within the present invention by providing two opposingly mated annular grommet pieces, each made as a substantially cylindrical segment, one piece including a central annular boss tapered on its exterior and the other including a similar boss tapered in its annulus. Each of the foregoing bosses extends axially from an annular base forming a shoulder at the junction therewith. A peripheral bead on the end of the first boss then engages a recess in the interior of the other boss, once brought together, providing retention during assembly. Thereafter, a threaded fastener is brought home, compressing the assembly across a steel washer fixed on the exterior of one of the pieces.

Preferably, the two pieces are formed of a resilient material structure and include a mating strap to keep the assembly as a paired unit. On compression the tapered mating surfaces migrate over each other, expanding the sectional dimension within the opening of the suspension strap. In this manner compressive contact is achieved both across the strap and within the opening itself. To achieve the desired compression in all the contact directions the taper along the boss surfaces is substantially steeper than the ratio of the exterior diameter to the diameter of the opening in the strap. This then assures a peripheral expansion of the boss' exterior when the pieces are compressed.

BRIEF DESCRIPTION OF THE DRAWINGS

FIG. 1 is a side view, in section, of the inventive grommet assembly in its unassembled form;

FIG. 2 is yet another side view of the inventive grommet assembly in its installed engagement; and FIG. 3 is a perspective illustration of the inventive grommet assembly.

DESCRIPTION OF THE PREFERRED EMBODIMENT

As shown in FIGS. 1-3, the inventive grommet assembly, generally illustrated by the numeral 10, comprises a first grommet piece 30 connected to a second grommet piece 60 by a flexible strap 50. More precisely, the first grommet piece 30 includes an annular base 31 provided with an exterior face 32 and an interior face 33. Face 32 includes a metallic washer 34 imbedded for retention and aligned coaxially with a fastener opening 35. Opening 35 extends through the base 31, communicating at the other end in the interior of a tapered cavity 36 formed within a cylindrical boss 40. The exterior edge of boss 40, moreover, is cut off to a shoulder 41 to present a reduced extension 42 at the free end, and the interior juncture between the opening 35 and cavity 36 is recessed by a peripheral groove 39.

In a similar manner the second piece 60 is defined by an annular base 61 having an exterior face 62 and an interior face 63. A tapered boss 70 extends axially from face 63 with a bore 65 being formed through the common center axes of the boss and the base. The free edge of boss 70 is enlarged as a peripheral bead 71 conformed for receipt in the groove 39 upon mating. The exterior taper of boss 70 is formed to match the interior taper in cavity 36 with surface contact therebetween selected upon the mating of bead 71 in groove 39. An annular recess 64 is formed around the base of the boss 70 for receipt of the extension 42 upon the mating of the pieces.

The mating pieces 30 and 60, and the strap 50 joining same, may be formed by casting or molding resilient polymeric material, such as neoprene, polyurethane, or latex based polymers. Thus, the compressive insertion of boss 70 into the interior of cavity 36 will result in the enlargement of their common exterior section. A suspension strap SS may be provided with an opening SO conformed to the nominal exterior dimension which, upon the foregoing enlargement, effects a compression fit therein. Thus, any threaded fastener TF conformed to the interior dimensions of the bore 65 will, upon advancement, compress the strap between the faces 33 and 63, while at the same time effecting a compression fit within the opening SO.

It has been found that a taper ratio greater than 3 to 1, for each unit of length to each unit of width, provides sufficient hoop expansion at compressive engagement. Thus, taper ratios greater than 3:1 in the cavity 36 and the exterior surface of boss 70 accommodate effectively the compressive engagement desired. To achieve the desired compressive distribution on all the mating surfaces of the strap a generally equal thickness is preferred in the bases 31 and 61 and the combined wall thickness of the mated bosses.

In this manner a fastening grommet assembly is devised which, in the course of assembly, is conveniently engaged. Thereafter, the threaded engagement of the fastener provides the required compression across the bedded washer 34. The assembly is thus useful in simplifying the engagement task, while also providing a resilient interface at all the surfaces through which the load is transferred. As a further advantage the assembly effects a confinement of substantially the whole of the resilient volume, thus passing the larger deflections of low frequency modes, while attenuating the higher frequency, lower amplitude components within its internal deflections. The heat thus dissipated in the grommet structure is then effectively taken out through the intimate contact with the metal pieces connected.

Obviously many modifications and changes may be made to the foregoing without departing from the spirit of the invention. It is therefore intended that the scope of the invention be determined solely on the claims appended hereto.

What is claimed is:

1. A grommet assembly conformed for suspending articles from a suspension frame, comprising:
   a first grommet piece of a generally annular form, characterized by an annular base having a first generally cylindrical boss extending from one side thereof and terminating at a first free end;
   a second grommet piece of a generally annular form characterized by an annular base having a second generally cylindrical boss extending from one side thereof and terminating at a second free end, said second free end including a peripheral bead formed around the exterior thereof;
   said first boss including a central cavity of a tapered configuration having a larger cavity dimension at said first free end and an interior radial recess conformed to engage said peripheral bead;
   said second boss including a generally tapered exterior surface conformed for mating receipt in said cavity upon the engagement of said bead in said recess;
   a first bore formed in said first grommet piece communicating coaxially with said central cavity;
   a second bore formed to extend axially through said second grommet piece, said second bore having an interior radial dimension equal to said first bore;
   a strap extending between said first and second grommet pieces;
   said first and second grommet pieces and said strap being formed of a resilient polymeric material structure;
   an annular metallic washer imbedded in said first grommet piece in coaxial alignment with said first bore and positioned distal of said first boss;
   said first boss further including a reduced section extension at the exterior of said first free end; and
   said second grommet piece includes an annular pocket adjacent the base of said second boss conformed to receive said extension.

* * * * *